UNITED STATES PATENT OFFICE.

O. E. LOOMIS, OF ELLENBURG, NEW YORK.

Letters Patent No. 78,530, dated June 2, 1868.

IMPROVED SOAP.

The Schedule referred to in these Letters Patent and making part of the same.

TO ALL WHOM IT MAY CONCERN:

Be it known that I, O. E. LOOMIS, of Ellenburg, in the county of Clinton, and State of New York, have invented a new and useful Improvement in Soap; and I do hereby declare the following to be a full, clear, and exact description of the same.

The subject of this invention is a soap designed for washing purposes generally. It has been found a superior article for cleansing fabrics soiled with grease, and as a toilet-soap is desirable, by reason of the fact that it leaves the skin in a soft, smooth condition, and effectually prevents chapping. It combines cheapness with the above qualities, and, in fact, from the best data at command, I feel justified in stating that its first cost, if not less than that of the common brown soap, does not exceed the same in the slightest degree.

In making my improved soap, I first slake, say, six pounds, of lime, in about ten gallons of clear water. The water is drawn off, and about twelve pounds of sal-soda are added thereto, together with twelve pounds of fish-oil. This mixture is boiled for one hour, more or less, and during the boiling process, two pounds of starch, one pound of rosin, and one pound of saltpetre are added. After boiling, but while the mass is yet warm, I add one pint of alcohol and six pounds of white kaolin.

The soap thus prepared continues to harden until it has assumed the desired state of induration, when it is prepared for use and sale in customary manner.

Having thus described my invention, what I claim as new, and desire to secure by Letters Patent, is—

A soap compounded of the ingredients and in the manner herein set forth.

O. E. LOOMIS.

Witnesses:
    CHAS. D. SMITH,
    J. McKENNEY.